No. 637,790. Patented Nov. 28, 1899.
W. A. HINKLE & D. N. ASHMORE.
ROD COUPLING.
(Application filed June 29, 1899.)

(No Model.)

Attest
Nora Graham.
Ina Graham.

Inventors
William A. Hinkle
David N. Ashmore
by L. P. Graham
their attorney.

United States Patent Office.

WILLIAM A. HINKLE, OF FORSYTH, AND DAVID N. ASHMORE, OF BETHANY, ILLINOIS; SAID ASHMORE ASSIGNOR TO SAID HINKLE.

ROD-COUPLING.

SPECIFICATION forming part of Letters Patent No. 637,790, dated November 28, 1899.

Application filed June 29, 1899. Serial No. 722,284. (No model.)

*To all whom it may concern:*

Be it known that we, WILLIAM A. HINKLE, of Forsyth, in the county of Macon, and DAVID N. ASHMORE, of Bethany, in the county of Moultrie, State of Illinois, have invented certain new and useful Improvements in Rod-Couplings, of which the following is a specification.

This invention is designed to provide a simple and secure means for coupling the ends of sections of rods together. It is exemplified in the structure hereinafter described, and it is defined in the appended claims.

Figure 1:
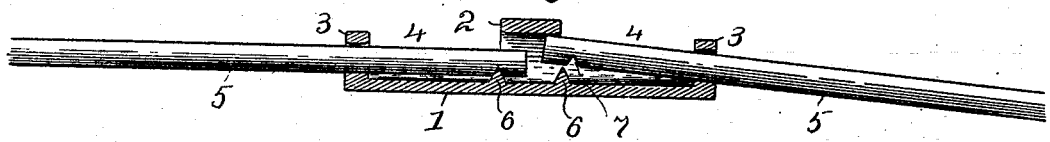
Figure 2:
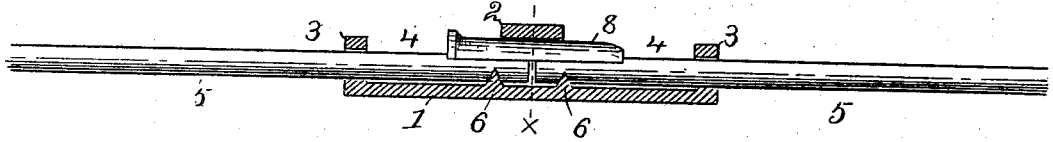
Figure 3:
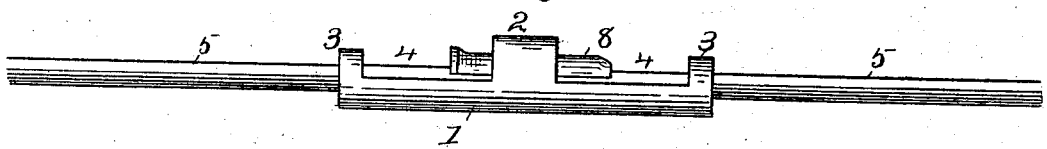
Figure 4:
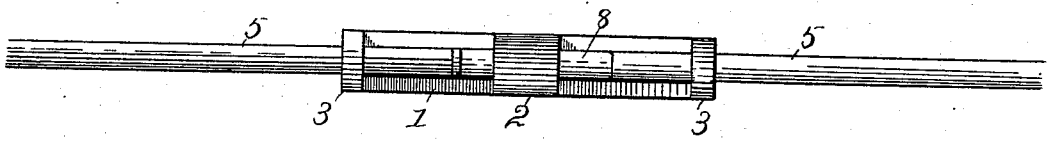
Figure 5:
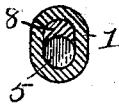

In the drawings forming part of this specification, Figure 1 is a longitudinal section through the coupling-sleeve, showing how the rods are placed therein preparatory to coupling them together. Fig. 2 is a similar section showing the rods coupled together. Fig. 3 is an elevation of the coupling and the rods therein. Fig. 4 is a plan of the coupling. Fig. 5 is a cross-section on line $x$ in Fig. 2.

The coupling-sleeve has a central ring 2, somewhat larger in internal diameter than the rods 5 to be coupled, and it has end rings 3, adapted to freely admit the rods. Between the end rings and the central ring the sleeve is open on one side, as shown at 4, and in the central ring or adjacent thereto, in the side of the sleeve opposite openings 4, are ribs or ledges 6. These ribs are preferably triangular or A-shaped, as shown in the drawings, though their utility does not depend entirely on this form. The rods to be coupled have V-shaped notches 7 cut crosswise near their ends about one-third of the way through the rods, such notches being of a size to properly fit over the ribs 6 of the coupling-sleeve.

The central ring of the coupling-sleeve is large enough in internal diameter to permit the ends of the rods to pass over the ribs 6, as shown in Fig. 1, and when the rods are in place, with their notches fitting over the ribs, the space between the rods and the ring is occupied by a wedge, as 8, which holds the rods in close contact with the ribs and maintains the coupling. The ribs are preferably made a little higher than the notches are deep, so that wear in the coupling may be taken up by simply driving the wedge tighter into the central ring, and the V-shaped notches and corresponding ribs are particularly adapted to facilitate this adjustment.

A coupling made in accordance with our invention may be cheaply manufactured, easily coupled, and readily adjusted and repaired without any special tools.

What we claim is—

1. A rod-coupling comprising a sleeve having a central ring and end rings between which there are openings on one side of the sleeve, ribs in the sleeve on the side opposite the openings rods having recesses near their ends to fit over the ribs of the sleeve and a wedge to fit between the central ring and the ends of the rods and hold the rods in engagement with the ribs.

2. A rod-coupling comprising rods having V-shaped notches near their ends, a sleeve having a central ring and end rings between which there are openings on one side of the sleeve, ribs in the sleeve opposite the openings therein such ribs being shaped to conform to the V-shaped notches of the rods, and a wedge to fit between the central ring and the rods and hold the rods in engagement with the ribs.

In testimony whereof we sign our names in the presence of two subscribing witnesses.

WILLIAM A. HINKLE.
DAVID N. ASHMORE.

In presence of—
B. E. DICKINSON,
ROSA VOELCKER.